United States Patent [19]

Acampora et al.

[11] Patent Number: 5,231,486
[45] Date of Patent: Jul. 27, 1993

[54] DATA SEPARATION PROCESSING IN A DUAL CHANNEL DIGITAL HIGH DEFINITION TELEVISION SYSTEM

[75] Inventors: Alfonse A. Acampora, Staten Island, N.Y.; Richard M. Bunting, Hamilton Square, N.J.

[73] Assignee: General Electric Company, Princeton, N.J.

[21] Appl. No.: 918,751

[22] Filed: Jul. 27, 1992

[51] Int. Cl.⁵ .......................... H04N 7/12; H04N 7/00
[52] U.S. Cl. .................................... 358/133; 358/135; 358/141
[58] Field of Search ............... 358/141, 142, 133, 135, 358/11, 12; 375/25

[56] References Cited

U.S. PATENT DOCUMENTS

| | | | |
|---|---|---|---|
| 4,302,775 | 11/1981 | Widergren et al. | 358/136 |
| 4,870,497 | 9/1989 | Chamzas et al. | 358/133 X |
| 4,933,762 | 6/1990 | Guichard et al. | 358/133 |
| 5,027,193 | 6/1991 | Kami et al. | 358/12 |
| 5,055,927 | 10/1991 | Keesen et al. | 358/133 |
| 5,111,292 | 5/1992 | Kuriacose et al. | 358/133 |
| 5,122,875 | 6/1992 | Raychaudhuri et al. | 358/133 |
| 5,140,417 | 8/1992 | Tanaka et al. | 358/133 |
| 5,144,924 | 9/1992 | Savatiev | 358/133 |
| 5,148,272 | 9/1992 | Acampora et al. | 358/133 |
| 5,168,356 | 12/1992 | Acampora et al. | 358/133 |

FOREIGN PATENT DOCUMENTS 2138238 10/1984 United Kingdom ............... 358/141

Primary Examiner—James J. Groody
Assistant Examiner—Safet Metjahic
Attorney, Agent, or Firm—Joseph S. Tripoli; Eric P. Herrmann; Ronald H. Kurdyla

[57] ABSTRACT

A high definition video system processes a bitstream including high and low priority variable length coded Data words. The coded Data is separated into packed High Priority Data and packed Low Priority Data by means of respective data packing units. The coded Data is continuously applied to both packing units. High Priority and Low Priority Length words indicating the bit lengths of high priority and low priority components of the coded Data are applied to the high and low priority data packers, respectively. The Low Priority Length word is zeroed when High Priority Data is to be packed for transport via a first output path, and the High Priority Length word is zeroed when Low Priority Data is to be packed for transport via a second output path.

8 Claims, 3 Drawing Sheets

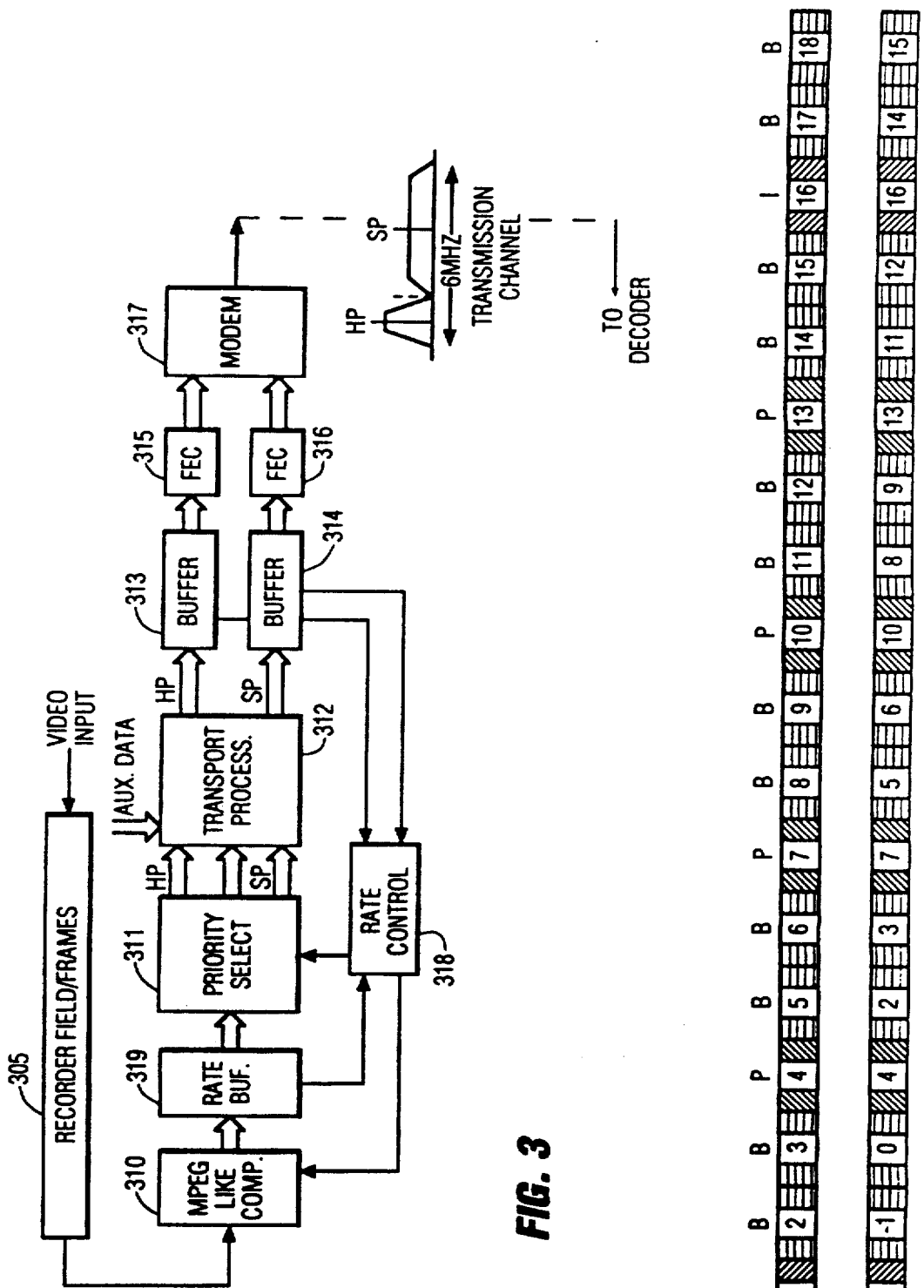

DATA SEPARATION PROCESSING IN A DUAL CHANNEL DIGITAL HIGH DEFINITION TELEVISION SYSTEM

FIELD OF THE INVENTION

This invention concerns apparatus for separating components of a digital video signal such as a television signal for example. In particular, this invention concerns apparatus for separating standard and high priority components of a high definition digital television signal in a manner which reduces potential clock control (synchronization) problems to a minimum.

BACKGROUND OF THE INVENTION

A high definition television (HDTV) signal is generally understood to contain image information with approximately twice the horizontal and vertical resolution of a standard television image (e.g., NTSC), and with a wider aspect ratio compared to a standard television image. An HDTV signal may be broadcast using a simulcast technique, where two versions of the same program material are broadcast simultaneously via separate standard 6 MHz channels. One of the two program versions contains standard definition NTSC information broadcast on one channel, while the other contains high definition information broadcast on the other 6 MHz channel.

The high definition simulcast channel can be implemented (in a standard 6 MHz channel) by using digital signal processing including signal coding and data compression techniques. In the process of coding digital high definition video data for transmission, the video data may be compressed and transmitted in a layered coded format. The layered format may incorporate header data identifying data segments such that, upon loss of data during transmission, a receiver can find an appropriate re-entry point in the received data stream. Extra protection against lost or corrupted data causing confusion or disrupted service at the receiver can be provided by arranging coded video data in transport blocks. The transport blocks include additional header data identifying relatively small portions of the video data. The header data advantageously may include pointers which indicate data re-entry points within respective transport blocks.

The video data may be compressed in a variety of ways, such as in MPEG format or a similar format. MPEG is a standardized coding format being established by the International Organization for Standardization. The standard is described in the document "International Organization for Standardization", ISO/IEC DIS 11172, Coding of Moving Pictures and Associated Audio for Digital Storage Media, Rev. Nov. 23, 1991, which document is incorporated herein by reference for description of the general code format. A system which processes a high definition television signal advantageously using MPEG-like processing and video data transport blocks with associated headers is described in copending U.S. patent application "Apparatus for Segmenting Encoded Video Signal for Transmission", A.A. Acampora et al., Ser. No. 814,207. In that system, a transport processor is used to form data words into transport data packets which comprise a transport block. The transport processor also generates the required transport headers, and merges the headers with the appropriate transport data packets to form transport blocks.

An exemplary HDTV signal processing system which may be used advantageously in a simulcast context is described in copending U.S. patent application Ser. No. 650,329 of H. E. White, filed Feb. 4, 1991. In that system a television signal including high definition image information is transmitted using two 32-QAM (Quadrature Amplitude Modulated) carriers frequency multiplexed in a 6 MHz transmission band. One of the carriers conveys high priority information, while the other carrier conveys (relatively lower) standard priority information. The high priority information is the information needed to create a viewable image, albeit less than a perfect image, and is conveyed with significantly more power than the standard priority information, which is the remaining information.

As discussed in the Acampora et al. patent application, a video signal of the dual carrier, dual priority type described in the White patent application is initially compressed in conformance with an MPEG-like format. Thereafter, MPEG-type signal codewords are parsed into two bitstreams in accordance with the relative importance of the respective codeword types. The bitstreams of relatively greater and lesser importance are assigned high priority and standard (low) priority status respectively, and are conveyed by the respective carriers.

It is herein recognized as desirable to parse the MPEG-type codewords into a high priority bitstream and a standard priority bitstream with a minimum of actual or likely disruption of the signal processing operation. In particular, it is recognized as desirable to accomplish such parsing without having to interrupt the bitstream such as by interrupting an associated system clock, thereby eliminating clock stop/start synchronization difficulties.

SUMMARY OF THE INVENTION

A data processing system according to the present invention is included in a high definition video signal coding system which provides an output bitstream of high priority packed coded data, and an output bitstream of standard priority packed coded data. In an illustrated embodiment, the high priority output is produced by a high priority data packer responsive to a bitstream of variable length codewords (VLCs), and to a data word indicating the length of an associated high priority data word. Similarly, the standard priority output is produced by a standard priority data packer which also is responsive to the VLC bitstream, and to a data word indicating the length of an associated standard priority data word. The VLC bitstream to be parsed and packed into high and standard priority data segments is continuously applied to both data packers.

In accordance with a feature of the invention, a LENGTH data word is associated with each variable length codeword. The LENGTH word is separable into a SP LENGTH word for indicating the length (number of bits) of an associated standard priority VLC, and into a HP LENGTH word indicating the length in bits of an associated high priority VLC. The standard priority data packer responds to the SP LENGTH word and to the VLC bitstream. The high priority data packer responds to the HP LENGTH word and to the VLC bitstream. During the presence of a standard priority VLC, the value of the HP LENGTH word is set to zero ("zeroed"), whereby the high priority data packer is caused to idle while the standard priority data packer processes the standard priority VLC. Similarly, the value of the SP LENGTH word is zeroed in the presence of a high priority VLC, whereby the standard priority packer is caused to idle while the high priority VLC is processed by the high priority data packer. Zeroing the SP LENGTH and the HP LENGTH words advantageously serves as a routing mechanism for the data associated with the non-zeroed LENGTH word which avoids switching the VLC bitstream between the HP and SP data packers, thereby also avoiding clock stop/start synchronizing problems.

BRIEF DESCRIPTION OF THE DRAWING

FIG. 3 is a block diagram of an HDTV encoding system including apparatus according to the invention.

FIGS. 4a and 4b are pictorial representations of sequences of image fields/frames of encoded video signals helpful in understanding the operation of the system shown in FIG. 3.

DETAILED DESCRIPTION

Figure 1:
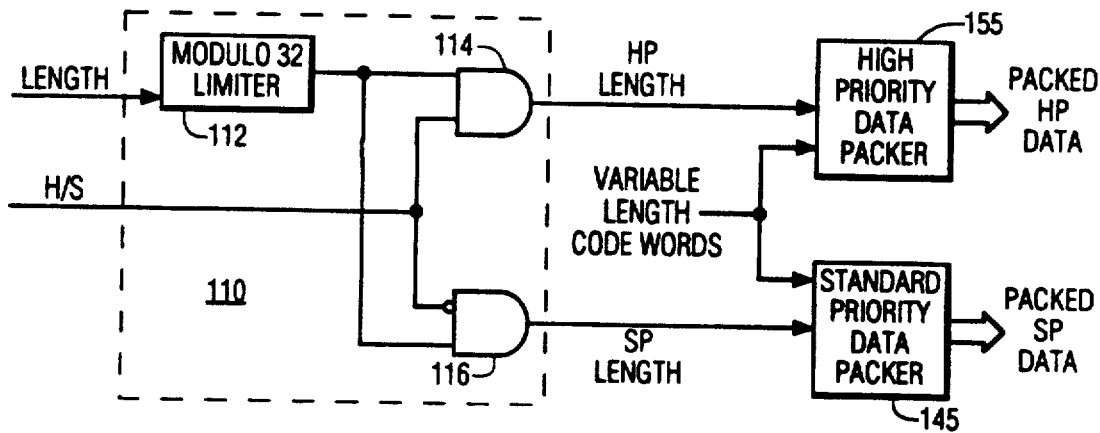
FIG. 1 is a block diagram of prioritized data separation apparatus according to the principles of the present invention.

Data separation apparatus according to the principles of the present invention, as shown in FIG. 1, will be described in the context of a high definition television (HDTV) coding system employing MPEG-like principles as described in copending U.S. patent application Ser. No. 814,207 of A.A. Acampora et al., filed Dec. 20, 1991 titled "Apparatus for Segmenting Encoded Video Signal for Transmission". Certain aspects of such system will be shown and discussed in connection with FIGS. 3, 4A, 4B, 5 and 6.

In FIG. 1, a signal separator and decoder unit 110 receives input signals LENGTH and H/S developed according to MPEG standards. The LENGTH signal comprises 6-bit parallel words coincident with associated variable length codewords for indicating the bit lengths of those codewords. The LENGTH signal is developed by a network associated with the data compression apparatus which develops the variable length codewords, e.g., compressor 310 in FIG. 3. Using conventional data processing techniques, as each VLC is generated its bit length is sensed and coded in binary form as the LENGTH signal, and transmitted via a 6-bit parallel path coincident with the associated VLC. Signal H/S is a 1-bit High/Standard priority indicator which exhibits a logic high during the occurrence of data in the VLC bitstream intended to be conveyed on the high priority carrier for the duration of the logic high. Conversely, a logic low for indicator H/S indicates the occurrence of standard priority data in the VLC bitstream intended to be conveyed on the standard priority carrier for the duration of the logic low.

Unit 110 includes an input modulo 32 limiter and logic AND gates 114 and 116 arranged as shown. Each of gates 114 and 116 is a gate array for processing the parallel 6-bit output signal from unit 112. Unit 110 separates the successive input LENGTH words into a standard priority word length indicator (SP LENGTH) and into a high priority word length indicator (HP LENGTH) in accordance with the logic state of high/standard priority indicator H/S. Illustratively, when indicator H/S exhibits a logic high (1) level during the occurrence of high priority data words, the output of gate 116 exhibits a 6-bit logic low (0) whereby the SP LENGTH indicator is zeroed. At the same time, gate 114 is enabled to pass the 6-bit (high priority) LENGTH word as the HP LENGTH indicator. Converse results obtain when indicator H/S exhibits a logic low during the occurrence of standard priority date, in which case the HP LENGTH indicator is zeroed and gate 116 passes the SP LENGTH data.

Input variable length codewords (VLCs) are expected to be between 0 and 32 bits in length, hence 6 bits are used for the LENGTH word. Since disallowed lengths in the range 33 to 63 can be supported in a 6-bit word, and since such values may be caused by external factors (power surges, etc.) and create problems in subsequent accumulators, the input LENGTH word is first processed by modulo 32 limiter 112. Unit 112 limits the number of an output word to from 0 to 32 to prevent exceeding the 32 bit boundary of an associated MPEG variable length codeword. Illustratively, an input LENGTH word representing number 34 appears as an output word representing number 2 The resulting codeword is packed with a length of "2". Albeit, this is likely to be incorrect since length "34" is a disallowed length. However, the ensuing error is recoverable, which may not be the case if an out of range length is present.

The separated high priority and standard priority length indicators, HP LENGTH and SP LENGTH, are applied to control inputs of respective high priority and standard priority data packers 155 and 145, which provide a bitstream of packed VLC datawords at respective outputs. The data packers also receive the VLC bitstream concurrently. When the H/S indicator exhibits a logic high, high priority word length indicator HP LENGTH is present coincident with the corresponding VLC, and standard priority word length indicator SP LENGTH exhibits a zero value. Conversely, when the H/S indicator exhibits a logic low, standard priority word length indicator SP LENGTH is present coincident with the corresponding VLC, and high priority word length indicator HP LENGTH exhibits a zero value. The packed data from units 145 and 155 may be grouped into transport blocks each containing a prescribed number of data words preceded by a transport header containing information to facilitate their identification at a decoder. A video signal processing system using video data transport blocks with associated headers is described in the aforementioned Acampora et al. patent application, and is discussed in part in connection with FIGS. 3–6 herein.

The technique of zeroing the standard priority and the high priority LENGTH words advantageously simplifies the processing of the MPEG variable length codewords, which are conveyed via a 32-bit parallel bus. Specifically, this technique allows the VLC bus to be connected to both standard and high priority data packers 145 and 155 simultaneously and continuously, and there is no need to interrupt the VLC bitstream to separate the variable length codewords into the two categories of HP and SP data before packing. The system remains clocked without interruption, thereby avoiding the difficulties associated with start/stop clock synchronization. The zeroing process also simplifies the operation of accumulators associated with data packers 145 and 155, as will be discussed in connection with FIG. 2. For example, an accumulator associated with standard or high priority processing is caused to idle at the last accumulated value when the associated standard or high priority length word is zeroed (i.e., the last accumulated value is incremented with a zero value continually while at idle). Such manner of operation also eliminates clock control and synchronization problems with respect to accumulator operation.

Figure 2:
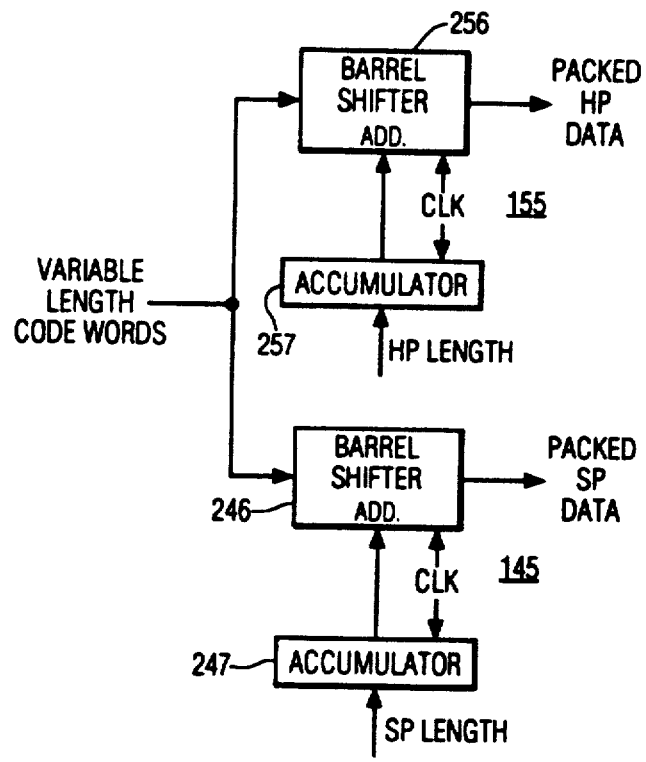
FIG. 2 shows details of a portion of the apparatus of FIG. 1.

FIG. 2 shows additional details of data packers 145 and 155 in FIG. 1. High priority data packer 155 includes a barrel shifter 256 and an accumulator 257, and standard priority data packer 145 comprises a similarly arranged barrel shifter 246 and accumulator 247. Barrel shifters 256 and 246 receive the parallel 32-bit variable length codeword bitstream concurrently at a signal input, and receive output signals from accumulators 257 and 247 at respective address inputs. Accumulators 257 and 247 receive the HP LENGTH and SP LENGTH indicators respectively. Barrel shifters 256 and 246 are standard units, e.g., Texas Instruments type SN 74AS8838.

Considering HP data packer 155, as a VLC appears at the data input of barrel shifter 256, an associated HP LENGTH word appears at the input of accumulator 257. With each clock, the input VLC is passed by barrel shifter 256 so that the leading bit of the VLC occupies the next available bit position in the HP packed data bitstream. If the VLC is a valid codeword, it will be "protected" in the packed data bitstream upon the appearance of the next clock. This next clock causes the accumulator to increment by the length of the previous VLC. The barrel shifter address moves to the left so as to encompass the previous VLC (i.e., the new VLC moves to the left in the packed data bitstream. and is positioned at the bit adjacent to the last valid bit of the previous VLC). The amount that the pointer moves is a function of the length of the VLC as indicated by HP LENGTH, which causes accumulator 257 to increment by the length of the VLC. The accumulator increment causes the barrel shifter address to increment the same amount, whereby the position of the pointer is determined. This next clock also causes barrel shifter 256 to pass the next VLC to the next position in the HP packed data bitstream.

The VLC in the packed data bitstream remains "unprotected", i.e., it is subject to being overwritten, until the pointer is caused to move as described above. An invalid VLC condition will cause the pointer to remain static, i.e., in its last position. This condition occurs when either the HP LENGTH or the SP LENGTH indicators exhibit a zero value in the process of separating high priority and low priority VLCs from the input bitstream to the respective packed data bitstreams. Such zero values cause the associated accumulator to idle, whereby the accumulator output does not increment, the barrel shifter address does not change, and the pointer does not move. Any VLC then applied to the barrel shifter is considered to be invalid and is overwritten until a valid VLC appears. Since zero length corresponds to non-existence, there is no valid VLC with a zero length.

Continuing with the example above, if the next VLC in the input bitstream is a standard priority VLC, the HP LENGTH indicator is zeroed as explained above, indicating the absence of a high priority VLC. Accumulator 257 does not increment, whereby its output and the barrel shifter address do not change. The standard priority VLC is sent to a high priority bitstream location which is not protected by the HP processor because with accumulator 257 not incrementing, the barrel shifter address does not change and the pointer remains static. However, the standard priority VLC SP is protected by unit 145 and packed in the SP packed data stream from the output of shifter 246 in the manner explained above for valid high priority data. Data received by barrel shifter 256 remains unprotected until a valid high priority VLC is again indicated by HP LENGTH. It may happen that a given VLC is too large to fit into the space remaining in the unprotected bit range of the barrel shifter. In such case a second (overflow) barrel shifter arrangement can be used as known to process the remnant of such large VLC, which remnant would be held and protected at the beginning of the overflow barrel shifter.

An exemplary HDTV signal processing system which may employ the present invention processes a two-to-one interlaced signal of 1050 lines at 59.94 frames per second. The nominal active picture has 960 lines of 1440 pixels each with a wide 16×9 aspect ratio. The signal is transmitted using two 32-QAM (qaudrature amplitude modulated) carriers frequency multiplexed in a 6 MHz transmission band. The nominal total bit rate, including video, audio and auxiliary data, is 26–29 Mbps.

The video signal is initially compressed in conformance with an MPEG-like format. Thereafter MPEG-type signal codewords are parsed into two bit streams in accordance with the relative importance of the respective codeword types. The two bit streams are independently processed to apply error correction overhead bits, and then QAM modulate respective carriers which are combined for transmission. The bit streams of relatively greater and lesser importance are designated high priority (HP) and (relatively lower) standard priority (SP) channels respectively. The high priority channel is transmitted with approximately twice the power of the standard priority channel. The high priority/standard priority information ratio is approximately one-to-four.

FIG. 3 illustrates an exemplary HDTV encoding system employing apparatus according to the invention. FIG. 3 shows the system processing a single video input signal, but it is to be understood that the luminance and chrominance components are processed separately, and that luminance motion vectors are used for generating compressed chrominance components. The compressed luminance and chrominance components are interleaved to form macroblocks before codeword priority parsing.

A sequence of image fields/frames shown in FIG. 4A is applied to circuitry 305 which reorders the fields/frames according to FIG. 4B. The reordered sequence is applied to a compressor 310 which generates a compressed sequence of frames that are coded according to an MPEG-like format. This format is hierarchical and is illustrated in abbreviated form in FIG. 6.

The MPEG hierarchical format includes a plurality of layers each with respective header information. Nominally each header includes a start code, data related to the respective layer and provision for adding header extensions. Much of the header information (as indicated in the referenced MPEG document) is required for synchronization purposes in an MPEG systems environment. For purposes of providing a compressed video signal for a digital HDTV simulcast system, only descriptive header information is required. The respective layers of the coded video signal are illustrated pictorially in FIG. 5.

When referring to the MPEG-like signal produced by the system, what is meant is that (a) successive picture fields/frames of video signals are encoded according to an I, P, B coding sequence, and (b) coded data at the picture level is encoded in MPEG-like slices or group of blocks, where the number of slices per field/frame may differ and the number of macro blocks per slice may differ. An I coded frame is one which is intraframe compressed such that only I frame compressed data is required to reproduce an image. P coded frames are coded according to a forward motion compensated predictive method, that is the P frame coded data is generated from the current frame and an I or P frame occurring before the current frame. B coded frames are coded according to a bidirectionally motion compensated predictive method. The B coded frame data is generated from the current frame and from I and P frames occurring both before and after the current frame.

Figure 6:
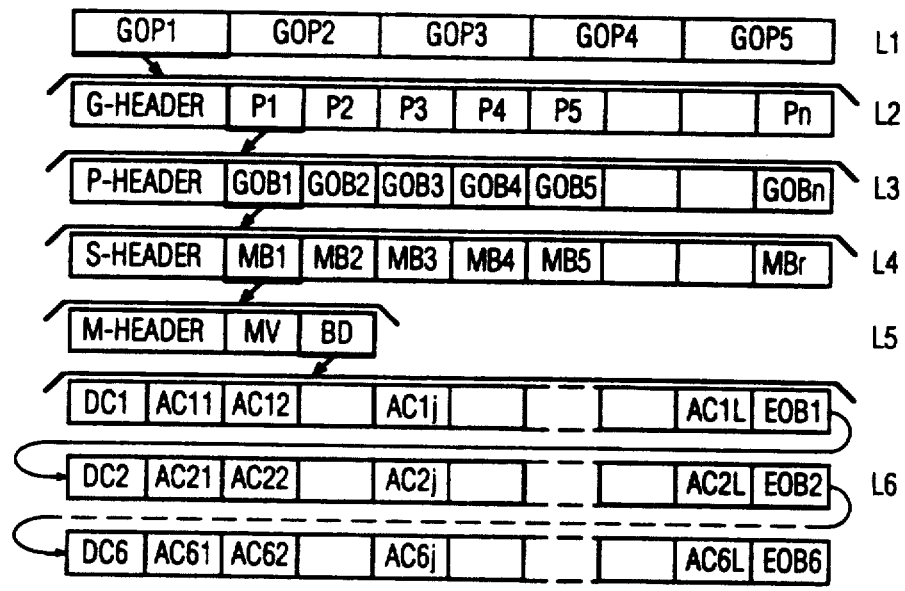
FIG. 6 is a generalized pictorial representation of the data format provided by the compression apparatus in the system of FIG. 3.
Figure 5:
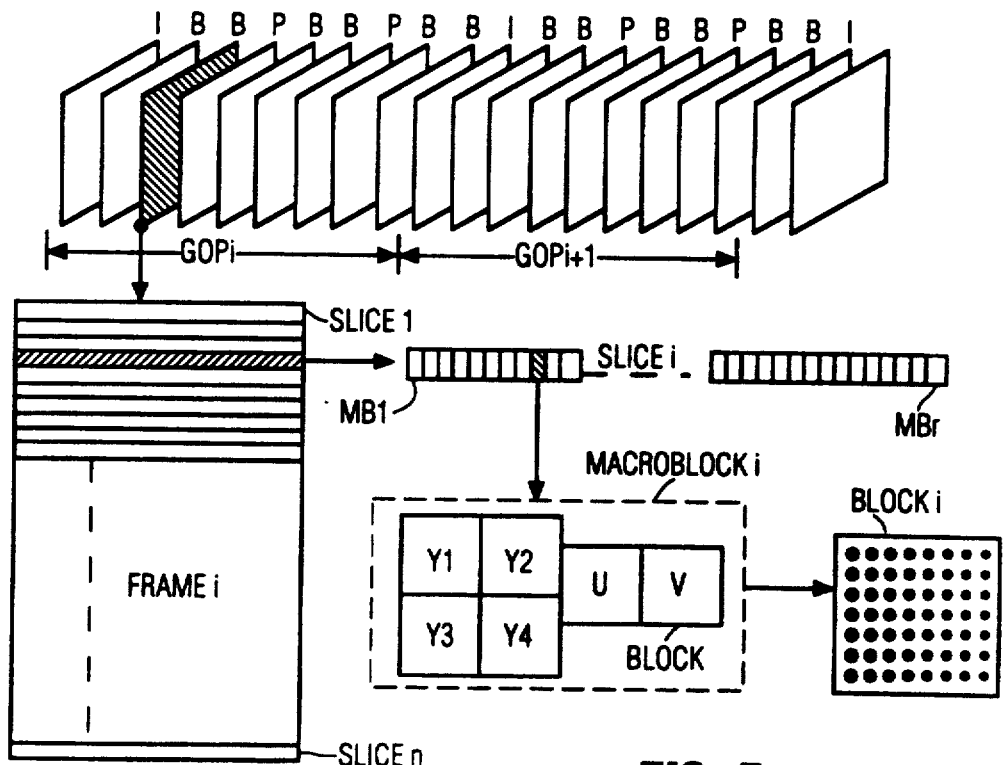
FIG. 5 is a pictorial representation of datablock generation developed by compression apparatus in the system of FIG. 3.

The coded output signal of the present system is segmented in groups of fields/frames, or groups of pictures (GOP) illustrated by the row of boxes L2 (FIG. 6). Each GOP (L2) includes a header followed by segments of picture data. The GOP header includes data related to the horizontal and vertical picture size, the aspect ratio, the field/frame rate, the bit rate, etc.

The picture data (L3) corresponding to respective picture fields/frames includes a picture header followed by slice data (L4). The picture header includes a field/frame number and a picture code type. Each slice (L4) includes a slice header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Each macroblock includes 6 blocks, including four luminance blocks, one U chrominance block and one V chrominance block. See FIG. 5. A block represents a matrix of pixels, e.g., 8×8, over which a discrete cosine transform (DCT) is performed. The four luminance blocks are a 2×2 matrix of contiguous luminance blocks representing, e.g., a 16×16 pixel matrix. The chrominance (U and V) blocks represent the same total area as the four luminance blocks. That is, before compression the chrominance signal is subsampled by a factor of two horizontally and vertically relative to luminance. A slice of data corresponds to data representing a rectangular portion of an image corresponding to an area represented by a contiguous group of macroblocks. A frame may include a raster scan of 360 slices, 60 slices vertically by 6 slices horizontally.

The block coefficients are provided one block at a time with the DCT. The DC coefficient occurs first followed by respective DCT AC coefficients in the order of their relative importance. An end of block code EOB is appended at the end of each successively occurring block of data.

The amount of data provided by compressor 310 is determined by rate control element 318. As is well known, compressed video data occurs at variable rates, and data is desirably transmitted at a constant rate equivalent to the channel capacity, to realize efficient use of the channel. Rate buffers 313 and 314 perform the variable to constant data rate translation. It is also known to adjust the amount of data provided by the compressor in accordance with the level of occupancy of the buffers. Thus the buffers 313 and 314 include circuitry to indicate their respective level of occupancy. These indications are applied to rate controller 318 to adjust the average data rate provided by compressor 310. The adjustment is typically accomplished by adjusting the quantization applied to the DCT coefficients. Quantization levels may be different for the different types of frame compression.

Compressed video data hierarchically formatted as indicated in FIG. 6 is coupled to a priority select element 311, which includes means (e.g., unit 210 in FIG. 2) for parsing the coded data between a high priority channel HP and a standard priority channel SP. High priority information is that information the loss or corruption of which would create the greatest degradation in reproduced images. Stated conversely, it is the least data needed to create an image, albeit less than a perfect image. Standard priority information is the remaining information. The high priority information includes substantially all of the header information included in the different hierarchical levels plus the DC coefficients of the respective blocks and a portion of the AC coefficients of the respective blocks (level 6, FIG. 6).

The ratio of HP and SP data at the transmitter is approximately 1:4. At the transport processor auxiliary data is added to the signal to be transmitted. This auxiliary signal may include digital audio and teletext data for example. The average amount of the auxiliary data included in the HP channel is calculated and compared to the expected statistical average of the compressed video information. From this the ratio of high and standard priority compressed video information is calculated. Priority select unit 311 parses the data provided by compressor 310 according to this ratio.

The HP and SP compressed video data are coupled to a transport processor 312, which may include apparatus such as unit 200 in FIG. 2. Transport processor 312 (a) segments the HP and SP data streams into transport blocks, (b) performs a parity or cyclic redundancy check on each transport block and appends the appropriate parity check bits thereto, and (c) multiplexes the auxiliary data with the HP or SP video data. The parity check bits are utilized by the receiver for isolating errors in conjunction with synchronizing header information and for providing error concealment in the event of uncorrectable bit errors in the received data. Each transport block includes a header including information indicative of the type of information included in the block, e.g., video audio and pointers to the starting points of contiguous like data.

The HP and SP data streams from transport processor 312 are applied to the respective rate buffers 313 and 314, which convert the variable rate compressed video data from processor 312 to data occurring at a substantially constant rate. The rate adjusted HP and SP data are coupled to forward error coding (FEC) elements 315 and 316 which (a) perform REED SOLOMON forward error correction encoding independently to the respective data streams; (b) interleave blocks of data to preclude large error bursts from corrupting a large contiguous area of a reproduced image; and (c) appends codes, e.g., Barker codes, to the data for synchronizing the data stream at the receiver. Thereafter the signals are coupled to a transmission modem 317 wherein the HP channel data quadrature amplitude modulates a first carrier and the SP channel data quadrature amplitude modulates a second carrier displaced from the first carrier by approximately 2.88 MHz. Since the HP information is transmitted in a narrower bandwidth, it is much less prone to corruption by the transmission channel. The HP carrier is located in the portion of the frequency spectrum of an, e.g., NTSC TV, transmission channel normally occupied by the vestigial sideband of a standard NTSC TV signal. This portion of the signal channel is normally significantly attenuated by the Nyquist filters of standard receivers and thus HDTV signals with this transmission format will not introduce cochannel interference.

At a receiver decoder (not shown) the transmitted signal is detected by a modem which provides two signals corresponding to the HP and SP channel signals. These two signals are applied to respective REED SOLOMON error correcting decoders. Error corrected signals are coupled to rate buffers which may receive data at the fixed channel variable rate and output data at a variable rate according to the requirements of subsequent decompression circuitry. The variable rate HP and SP data are applied to a transport processor which performs the inverse of the operation performed by processor 312 at the encoder. It also performs a degree of error detection responsive to the parity check bits included in the respective transport blocks. The transport processor provides separated auxiliary data, HP data, SP data and an error signal. The latter three signals are coupled to a priority deselect processor which reformats the HP and SP data into an hierarchically layered signal which is applied to a decompressor which performs the inverse function of the compressor at the encoder. Additional details of apparatus which may be used for compressor 310, priority selector 311 and transport processor 312 of FIG. 3 are found in previously mentioned copending U.S. patent application Ser. No. 814,207.

What is claimed is:

1. In a high definition video signal processing system for processing a bitstream containing first priority variable length codewords and second priority variable length codewords, apparatus comprising:
  a first processor for forming first priority variable length codewords into data packets, said first processor having a data input, a control input for receiving a first length indicator indicative of the bit length of an associated first priority variable length codeword, and a packed data output;
  a second processor for forming second priority variable length codewords into data packets, said second processor having a data input, a control input for receiving a second length indicator indicative of the bit length of an associated second priority variable length codeword, and a packed data output; and
  means for coupling said bitstream continuously to said data inputs of said first and second processors so that said second processor receives said bitstream when said first processor is operative in response to the presence of said first priority codewords, and said first processor also receives said bitstream when said second processor is operative in response to the presence of said second priority codewords.

2. In a high definition video signal processing system for processing a bitstream containing first priority variable length codewords and second priority variable length codewords, apparatus comprising:
  a first processor for forming first priority variable length codewords into data packets, said first processor having a data input, a control input for receiving a first length indicator indicative of the bit length of an associated first priority variable length codeword, and a packed data output;
  a second processor for forming second priority variable length codewords into data packets, said second processor having a data input, a control input for receiving a second length indicator indicative of the bit length of an associated second priority variable length codeword, and a packed data output; and
  means for coupling said bitstream continuously to said data inputs of said first and second processors so that said second processor receives said bitstream when said first processor is operative in response to the presence of said first priority codewords, and said first processor also receives said bitstream when said second processor is operative in response to the presence of said second priority codewords, wherein
  said second length indicator exhibits a zero value when first priority variable length codewords are present for processing by said first processor; and
  said first length indicator exhibits a zero value when second priority variable length codewords are present for processing by said second processor.

3. Apparatus according to claim 2, wherein
  said first processor idles at its last operating state when said first length indicator exhibits a zero value; and
  said second processor idles at its last operating state when said second length indicator exhibits a zero value.

4. Apparatus according to claim 1, wherein
  said variable length codewords are in conformance with MPEG standards.

5. Apparatus according to claim 1 and further comprising
  means for modulating first and second frequency multiplexed carriers, situated at respective television signal baseband video frequencies in a standard television channel, with data received from said packed data outputs of said first and second processors, respectively.

6. Apparatus according to claim 1, wherein each of said first and second processors comprises:
  data shifting means having a data input for receiving said bitstream containing variable length codewords, an address input and an output; and
  accumulator means having an input for receiving a length indicator indicative of the bit length of an associated variable length codeword, and an output coupled to said address input of said data shifting means.

7. Apparatus according to claim 6, wherein
  said data shifter means is a barrel shifter.

8. In a high definition video signal processing system for processing a bitstream containing first priority variable length codewords and second priority variable length codewords, apparatus comprising:
  a first processor for forming first priority variable length codewords into data packets, said first processor having a data input for receiving said bitstream, a control input for receiving a first length indicator indicative of the bit length of an associated first priority variable length codeword, and a packed data output; and a second processor for forming second priority variable length codewords into data packets, said second processor having a data input for receiving said bitstream, a control input for receiving a second length indicator indicative of the bit length of an associated second priority variable length codeword, and a packed data output; wherein said first length indicator exhibits a zero value for causing said first processor to exhibit an idle operating state when said second processor is operative in response to the presence of said second priority codewords; and said second length indicator exhibits a zero value for causing said second processor to exhibit an idle operating state when said first processor is operative in response to the presence of said first priority codewords.

* * * * *